(12) United States Patent
Rinne et al.

(10) Patent No.: US 8,897,380 B2
(45) Date of Patent: Nov. 25, 2014

(54) COPING WITH DISTORTION CAUSED BY WIDEBAND NOISE

(75) Inventors: Jukka Rinne, Tampere (FI); Ali Hazmi, Tampere (FI)

(73) Assignee: Nokia Corporation, Espoo (FI)

( * ) Notice: Subject to any disclaimer, the term of this patent is extended or adjusted under 35 U.S.C. 154(b) by 1041 days.

(21) Appl. No.: 12/664,050

(22) PCT Filed: Jun. 15, 2007

(86) PCT No.: PCT/FI2007/050359
§ 371 (c)(1),
(2), (4) Date: Aug. 5, 2010

(87) PCT Pub. No.: WO2008/152181
PCT Pub. Date: Dec. 18, 2008

(65) Prior Publication Data
US 2010/0297948 A1 Nov. 25, 2010

(51) Int. Cl.
| | | |
|---|---|---|
| H04L 27/00 | (2006.01) | |
| H04L 25/06 | (2006.01) | |
| H04N 21/438 | (2011.01) | |
| H04L 27/26 | (2006.01) | |
| H04N 21/643 | (2011.01) | |
| H04L 25/02 | (2006.01) | |
| H04L 25/03 | (2006.01) | |

(52) U.S. Cl.
CPC .......... *H04L 25/067* (2013.01); *H04N 21/4382* (2013.01); *H04L 27/2601* (2013.01); *H04L 25/0202* (2013.01); *H04N 21/64315* (2013.01); *H04L 25/03006* (2013.01)
USPC ........... 375/260; 375/262; 375/267; 375/295; 375/316; 375/322

(58) Field of Classification Search
CPC ....... H04L 5/007; H04L 5/006; H04L 1/0065; H04L 1/0071; H04L 5/0046; H04L 25/0202; H04L 25/0228; H04L 25/03006; H04L 25/067; H04L 27/2601; H04L 27/2613; H04L 27/2647; H04L 27/3461; H04L 43/50; H04B 7/0848; H04B 7/0667; H04B 7/0891; H04B 1/7156; H04B 2001/71563; H04B 3/54; H03M 13/1515; H03M 13/152; H03M 13/1545; H03M 13/155; H03M 13/2732
USPC ......... 375/259, 260, 261, 262, 265, 267, 271, 375/286, 295, 316, 322
See application file for complete search history.

(56) References Cited

U.S. PATENT DOCUMENTS

| | | | | |
|---|---|---|---|---|
| 5,852,630 | A | * | 12/1998 | Langberg et al. ............. 375/219 |
| 6,892,076 | B2 | | 5/2005 | Maalismaa et al. |

(Continued)

FOREIGN PATENT DOCUMENTS

| | | |
|---|---|---|
| EP | 0984583 A2 | 3/2000 |
| EP | 1255408 A1 | 11/2002 |

(Continued)

OTHER PUBLICATIONS

Office Action received in corresponding Korean Application No. 10-2009-7020939, Dated Oct. 25, 2011, 6 pages.

(Continued)

*Primary Examiner* — Hirdepal Singh
(74) *Attorney, Agent, or Firm* — Harrington & Smith

(57) ABSTRACT

A digital broadband broadcast receiver is configured to receive bits transmitted in transmission symbols, such as orthogonal frequency division multiplexing (OFDM) symbols. The reliability of the received bits is scaled with a non-linear scaling function which is in relation to the amount of interfered part of a received transmission symbol. In the scaling, a burst state information (BSI) and/or channel state information (CSI) method can be used.

18 Claims, 10 Drawing Sheets

(56) References Cited

U.S. PATENT DOCUMENTS

| | | |
|---|---|---|
| 7,359,311 B1* | 4/2008 | Paranjpe et al. ............ 370/203 |
| 7,477,915 B2 | 1/2009 | Leinonen et al. |
| 7,620,120 B2 | 11/2009 | Auranen |
| 7,796,560 B2 | 9/2010 | Rousu et al. |
| 7,865,167 B2 | 1/2011 | Leinonen et al. |
| 7,991,089 B2* | 8/2011 | Nakahara et al. .......... 375/346 |
| 8,379,778 B2* | 2/2013 | Yan et al. ................... 375/346 |
| 2003/0210749 A1* | 11/2003 | Asjadi ........................ 375/260 |
| 2006/0135083 A1 | 6/2006 | Leinonen et al. |
| 2006/0197538 A1 | 9/2006 | Leinonen et al. |
| 2007/0064835 A1 | 3/2007 | Auranen |
| 2007/0066228 A1* | 3/2007 | Leinonen et al. ......... 455/67.11 |
| 2007/0116141 A1* | 5/2007 | Li et al. ..................... 375/260 |
| 2007/0183522 A1* | 8/2007 | Garrett et al. .............. 375/260 |
| 2007/0189402 A1* | 8/2007 | Yang ........................... 375/260 |
| 2007/0280387 A1* | 12/2007 | Li et al. ...................... 375/347 |
| 2008/0119215 A1* | 5/2008 | Ji et al. ....................... 455/522 |
| 2009/0023404 A1 | 1/2009 | Leinonen et al. |
| 2010/0120467 A1* | 5/2010 | Auranen et al. ........... 455/552.1 |
| 2010/0297948 A1 | 11/2010 | Rinne et al. |
| 2010/0309810 A1* | 12/2010 | Wachsmann ................ 370/252 |

FOREIGN PATENT DOCUMENTS

| | | |
|---|---|---|
| EP | 1361719 A2 | 11/2003 |
| EP | 1361720 A1 | 11/2003 |
| EP | 1608094 A1 | 12/2005 |
| WO | 03073683 A1 | 9/2003 |
| WO | 03105386 A2 | 12/2003 |
| WO | 2004110088 A1 | 12/2004 |
| WO | 2006006833 A1 | 1/2006 |
| WO | 2007034037 A1 | 3/2007 |
| WO | 2007060504 A1 | 5/2007 |
| WO | 2008027616 A1 | 3/2008 |
| WO | 2008152181 A1 | 12/2008 |

OTHER PUBLICATIONS

International Search Report and Written Opinion of the International Searching Authority for PCT Application No. PCT/FI2009/050183, dated Dec. 4, 2009, 14 pages.

Hazmi et al., "Mitigation Techniques for High Power and Long Duration Interference in DVB-T/H Systems", The 18th Annual IEEE International Symposium on Personal, Indoor and Mobile Radio Communications (PIMRC'07).

Office Action received from Korean Patent Application No. 10-2009-7020939, dated Feb. 14, 2011, 12 pages.

"International Search Report and The Written Opinion of the International Searching Authority", received in corresponding PCT Application No. PCT/FI2007/050128, Dated Dec. 10, 2007, 11 pages.

Office Action received from Korean Patent Application No. 10-2009-7025609, dated Mar. 18, 2011, 7 pages.

"International Search Report and The Written Opinion of the International Searching Authority", received in corresponding PCT Application No. PCT/FI2007/050359, dated Dec. 18, 2008, 32 pages.

ETSI EN 300 744 v1.5.1 (Nov. 2004) Annex F: Additional Features for DVB Handheld Terminals (DVB-H), 64 pages.

* cited by examiner

COPING WITH DISTORTION CAUSED BY WIDEBAND NOISE

RELATED APPLICATION

This application was originally filed as PCT Application No. PCT/FI2007/050359 tiled Jun. 15, 2007.

FIELD OF THE INVENTION

The present invention generally relates to interoperability of digital broadband broadcasting and cellular communication systems. The invention relates particularly, though not exclusively, to a digital broadband broadcasting receiver coping with wideband noise originating from a time division multiple access (TDMA) based cellular transmitter.

BACKGROUND OF THE INVENTION

The number of different wireless communication services and systems has increased during last years, and intensive development for new services is continuing. Several different cellular networks are in use. Examples of different cellular networks include GSM (Global System for Mobile communication), PCS (Personal Communications Services) and $3^{rd}$ generation mobile communication networks. These networks may use different frequency bands in different parts of the world. In addition to cellular telecommunications, other wireless services have been developed. Examples of such wireless services include digital broadband broadcasting, such as DVB-T (Digital Video Broadcasting—Terrestrial) and DVB-H (Digital Video Broadcasting—Handheld) which provide digital television transmission and reception using orthogonal frequency division multiplexing (OFDM) transmissions.

Many modern terminals are already configured to support more than one wireless service. For example, terminals operating in time division multiple access systems, such as GSM, may also be capable of receiving digital broadband broadcast transmissions, such as DVB-H transmissions.

One of the problems in designing terminals supporting more than one wireless service is that the frequency bands supported by the services may be close to each other or, in some cases, even overlap. Thus, when the user of the terminal is using a first wireless service, communication using a second service may cause interference to the first service.

For example in the USA, a channel for a DVB-H service is allocated at frequency band of 1670 to 1675 MHz. In Europe, a frequency band allocation for the DVB-T and DVB-H service extends from 470 to 862 MHz in the ultrahigh frequency (UHF) band. It is also possible that future implementations in Europe and in the USA may utilize frequencies in higher or lower UHF frequencies as well. The frequency allocations are problematic since the cellular operation may cause in the terminal strong interference to the DVB-H reception, for example, if both of these services are operated simultaneously. For example, wideband noise of a transmitter operating in a GSM 900 or Extended GSM (EGSM) system (the transmission frequency range in these systems extends from 880 MHz to 890 MHz (EGSM) or from 890 MHz to 915 MHz (GSM 900)) desensitizes the uppermost DVB-T/H reception channels in Europe and wideband noise of PCS band transmission (1850 to 1990 MHz) desensitizes the DVB-H reception in the USA.

The interference problem is especially evident in terminals supporting both digital broadband broadcast reception and time division multiple access cellular services. The normal operation of a cellular transceiver may cause interference to the digital broadband broadcasting reception. More closely this means that the cellular transceiver typically transmits broadband noise in addition to the wanted signal. The broadband noise couples via a cellular antenna to a digital broadband broadcast reception antenna, folds on top of the digital broadband broadcast reception frequencies, and disturbs or even prevents reception. Another problem is that even the wanted cellular transmission signal can produce a blocking effect in digital broadband broadcast reception if the cellular transmission band is very close to the digital broadband broadcast transmission band making the transition band between the digital broadband broadcasting and cellular systems very short.

Broadband noise is typically produced by a power amplifier in the cellular receiver. In many cases, the broadband noise produced, for example, by the GSM transceiver is in-band interference, for example, for a DVB-H receiver and cannot be anymore filtered in the DVB-H receiver. The broadband noise has been suggested to be filtered in the cellular transceiver. In accordance with current understanding, however, it is not seen practically possible to make a filter which would be steep enough with low enough loss for cellular operation. Similarly, concerning the wanted cellular transmission signal near the digital broadband broadcast reception band, making a steep enough input filter which would filter the wanted cellular transmission signal in the digital broadband broadcast receiver is considered problematic or even impossible. According to another suggestion to reduce interference the use of block periods has been proposed. The intention was to block cellular transmission during digital broadband broadcast reception in order to avoid interference. However, the use of block periods in the conventional cellular systems would typically lead into irrecoverable damages in the quality of the cellular signal in certain services, such as voice calls.

The source of interference, that is the interfering transmitter, may reside either in the same device which comprises the interfered receiver or in a collocated device. Even when the source of interference resides in the collocated device, the level of interference may be high enough to block the reception in the interfered receiver.

The co-pending international patent application PCT/FI2007/050128, filed by the same assignee, presents a solution for coping with broadband noise in a digital broadband broadcast receiver. According to that solution, additional appropriate length time interleaving and time deinterleaving is added to the digital broadband broadcast transmitter and receiver, respectively, to spread the noise burst energy evenly across transmission symbols (such OFDM symbols). Furthermore, the timing information from a cellular transmitter is utilized in soft-bits generation by scaling the reliability of the received bits according to the amount of interfered part of a received transmission symbol. The latter method can be referred to as the burst state information (BSI) method.

SUMMARY

According to a first aspect of the invention there is provided an apparatus, comprising:
a digital broadband broadcast receiver configured to receive bits transmitted in transmission symbols; and
a scaling module configured to scale the reliability of the received bits with a non-linear scaling function which is in relation to the amount of interfered part of a received transmission symbol.

The apparatus may be configured to receive orthogonal frequency division multiplexing (OFDM) transmissions.

In an embodiment, the apparatus is configured to time the scaling based on detected cellular wideband noise transmitted by a cellular transmitter in the same or a co-located apparatus or based on information signaled about the presence of cellular wideband noise.

The interference (or wideband noise) may be bursty. It may appear in connection with transmission bursts. It may by periodic interference, such as time division multiple access (TDMA) based interference.

In an embodiment, the apparatus is configured to calculate the scaling function based on interfering transmission burst state information.

In an embodiment, in addition to scaling with a function based on interfering transmission burst state information, the apparatus is configured to scale the reliability of the received bits with a second function which is based on transmission channel state information.

In an embodiment, the burst state information indicates the number of samples not affected by the burst in relation to useful transmission symbol duration expressed in samples, or the number of samples not affected by the burst in relation to a maximum burst duration, expressed in samples, that could affect one transmission symbol. The channel state information may by a function of a channel frequency response estimate.

According to a second aspect of the invention there is provided a method, comprising:
receiving in a digital broadband broadcast receiver bits transmitted in transmission symbols; and
scaling the reliability of the received bits with a scaling function, wherein
the scaling function is a non-linear function and is in relation to the amount of interfered part of a received transmission symbol.

According to a third aspect of the invention there is provided computer readable medium having stored thereon a computer program executable in an apparatus, the computer program comprising:
program code for receiving in a digital broadband broadcast receiver bits transmitted in transmission symbols; and
program code for scaling the reliability of the received bits with a scaling function, wherein the scaling function is a non-linear function and is in relation to the amount of interfered part of a received transmission symbol.

According to a fourth aspect of the invention there is provided a scaling module for a digital broadband broadcast receiver configured to scale the reliability of received bits transmitted in transmission symbols, wherein the scaling module is configured to scale the reliability of the received bits by a non-linear scaling function which is in relation to the amount of interfered part of a received transmission symbol.

In an embodiment, the scaling module may comprise different functions or blocks relating to scaling. It may be implemented by a physical hardware module, software module or by their combination. In an embodiment, the scaling module is implemented by a hardware module with software and/or firmware control.

According to a fifth aspect of the invention there is provided an apparatus, comprising:
means configured to receive bits transmitted in transmission symbols; and
means configured to scale the reliability of the received bits with a non-linear scaling function which is in relation to the amount of interfered part of a received transmission symbol.

Various embodiments of the present invention are illustrated only with reference to certain aspects of the invention. It should be appreciated that corresponding embodiments may apply to other aspects as well.

BRIEF DESCRIPTION OF THE DRAWINGS

The invention will be described, by way of example only, with reference to the accompanying drawings, in which.

DETAILED SPECIFICATION

In the following description the DVB-H system is used as an example of a digital broadband broadcast system, and the GSM system is used as an example of a cellular communication system. DVB-H (and DVB-T) systems are orthogonal frequency division multiplexing (OFDM) based multicarrier modulation systems currently defined in the standards specification ETSI EN 300 744.

Examples of other applicable digital broadband broadcast systems include, inter alia, the following: Digital Video Broadcast—Terrestrial (DVB-T), Integrated Services Digital Broadcasting—Terrestrial (ISDB-T); 1seg, Digital Multimedia Broadcast-Terrestrial/Handheld (DMB-T/H), Terrestrial Digital Multimedia Broadcasting (T-DMB), Digital Audio Broadcasting (DAB), Digital Radio Mondiale (DRM), Forward Link Only (FLO), MediaFLO, Multimedia Broadcast Multicast Service (MBMS) of $3^{rd}$ generation partnership project (3GPP), Broadcast and Multicast Services (BCMCS) of $3^{rd}$ generation partnership project 2 (3GPP2), and data broadcast systems in accordance with Advanced Television Systems Committee (ATSC) Data Broadcast Standard. Examples of other applicable cellular communication systems are, for example, Digital-Advanced Mobile Phone Service (D-AMPS), Personal Digital Cellular (PDC) and many more.

Figure 1:
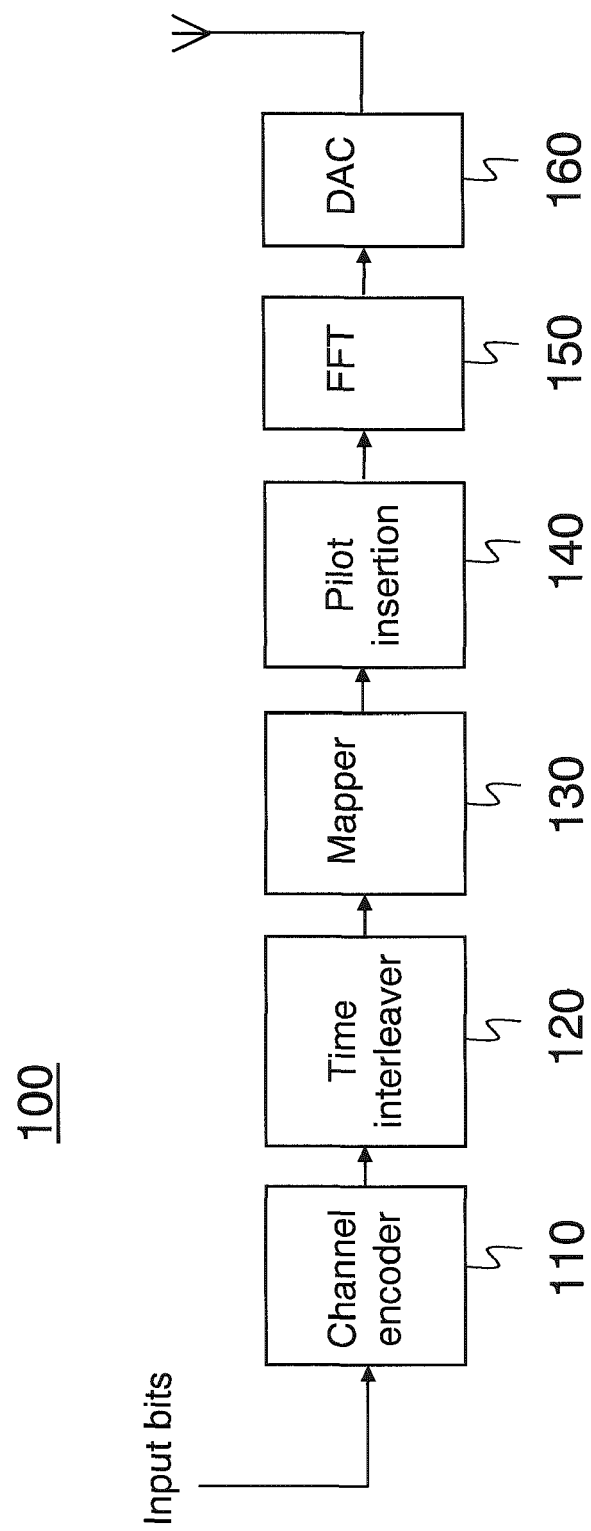
FIG. 1 shows a digital broadband broadcast transmitter in accordance with an embodiment.

FIG. 1 shows blocks of a DVB-T/H transmitter 100 (hereinafter referred to as broadband broadcast transmitter 100) according to an embodiment.

Digital data to be transmitted (Input bits) is inputted to a channel encoder block 110 for channel encoding. Operations performed in this block typically include Reed-Solomon encoding of the digital data in an outer coder (not shown), convolutional interleaving in an outer interleaver (not shown), encoding of the digital data with a convolutional code that may be punctured in an inner coder (not shown), and frequency interleaving of the digital data in appropriate bit and symbol interleavers. After frequency interleaving, digital data is fed into time interleaver 120 for time interleaving. The time interleaving may be performed bit-wise, byte-wise or word-wise, i.e., the units of digital data which are interleaved in time may be bits, bytes and/or n-bit long data words. Time interleaved digital data is conveyed to a mapper 130, which maps the time interleaved data into a chosen signal constellation. A pilot insertion block 140 organizes the signal to be transmitted into frames and adds to the frames pilot signals carriers for transmission parameter signalling data A Fast Fourier transform (FFT) block 150 performs an FFT transform to the digital data so as to transform the digital data into time domain for time-domain transmission. A digital-to-analog converter 160 converts the signal from digital to analog domain for transmission via a front end antenna.

Figure 2:
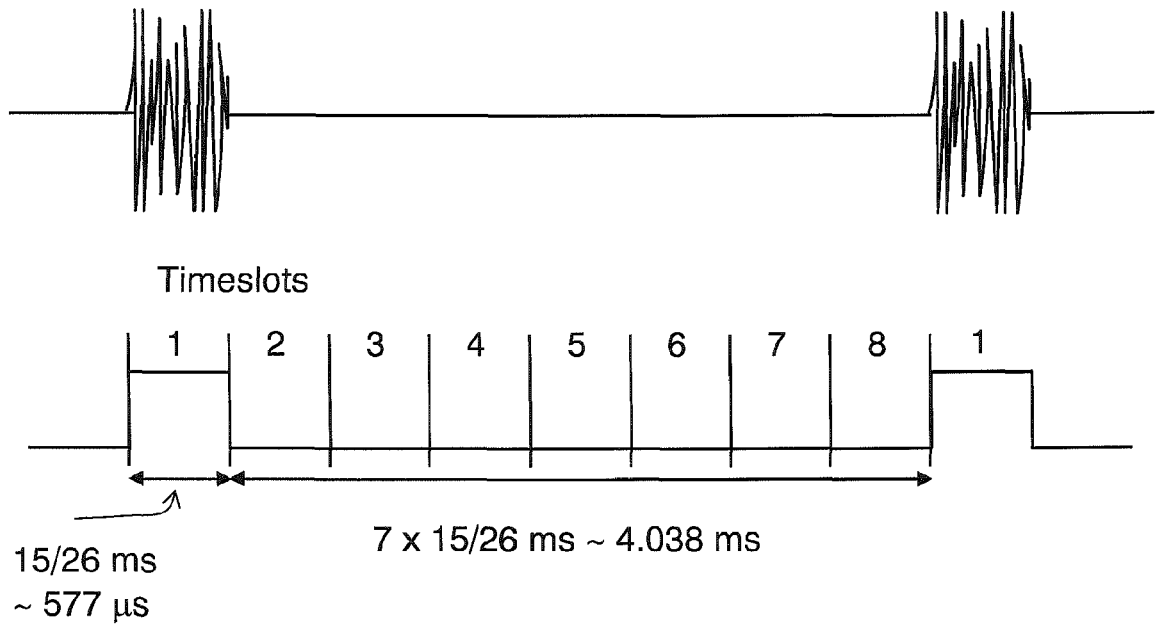
FIG. 2 shows the transmission bursts that are produced by a cellular transmitter in a time division multiple access system.

FIG. 2 shows schematically the transmission bursts that are produced by a cellular transmitter in a time division multiple access (TDMA) system. Transmission in TDMA systems is arranged in time slots. In the GSM system, in the air interface is used a TDMA frame of 120/26 ms, approximately 4.615 ms that has been divided into eight time slots (timeslots 1-8 in FIG. 2), each being 15/26 ms or about 577 μs long. A physical channel, that is, a series of regularly spaced timeslots on one or more frequencies may be allocated to a terminal for transmission. A physical channel comprises one timeslot in each consecutive TDMA frame. Alternatively, more than one time slot per one TDMA frame can be allocated. In the case shown in FIG. 2, the GSM transmitter transmits bursts in one time slot (time slot 1).

Figure 3:
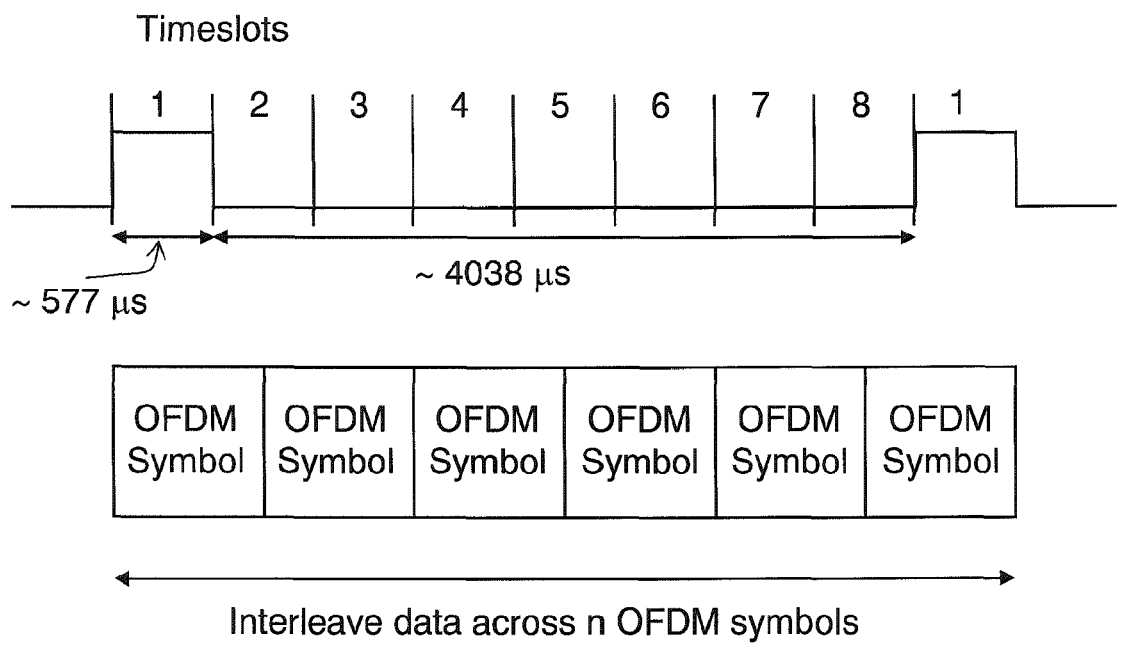
FIG. 3 shows interleaving in accordance with an embodiment.

FIG. 3 shows time interleaving in a digital broadband broadcast transmitter in accordance with an embodiment. Digital data carried in each OFDM symbol is interleaved across more than one OFDM symbol (n OFDM symbols) so that the interfering cellular noise burst energy is spread (preferably evenly) across symbols.

Figure 4:
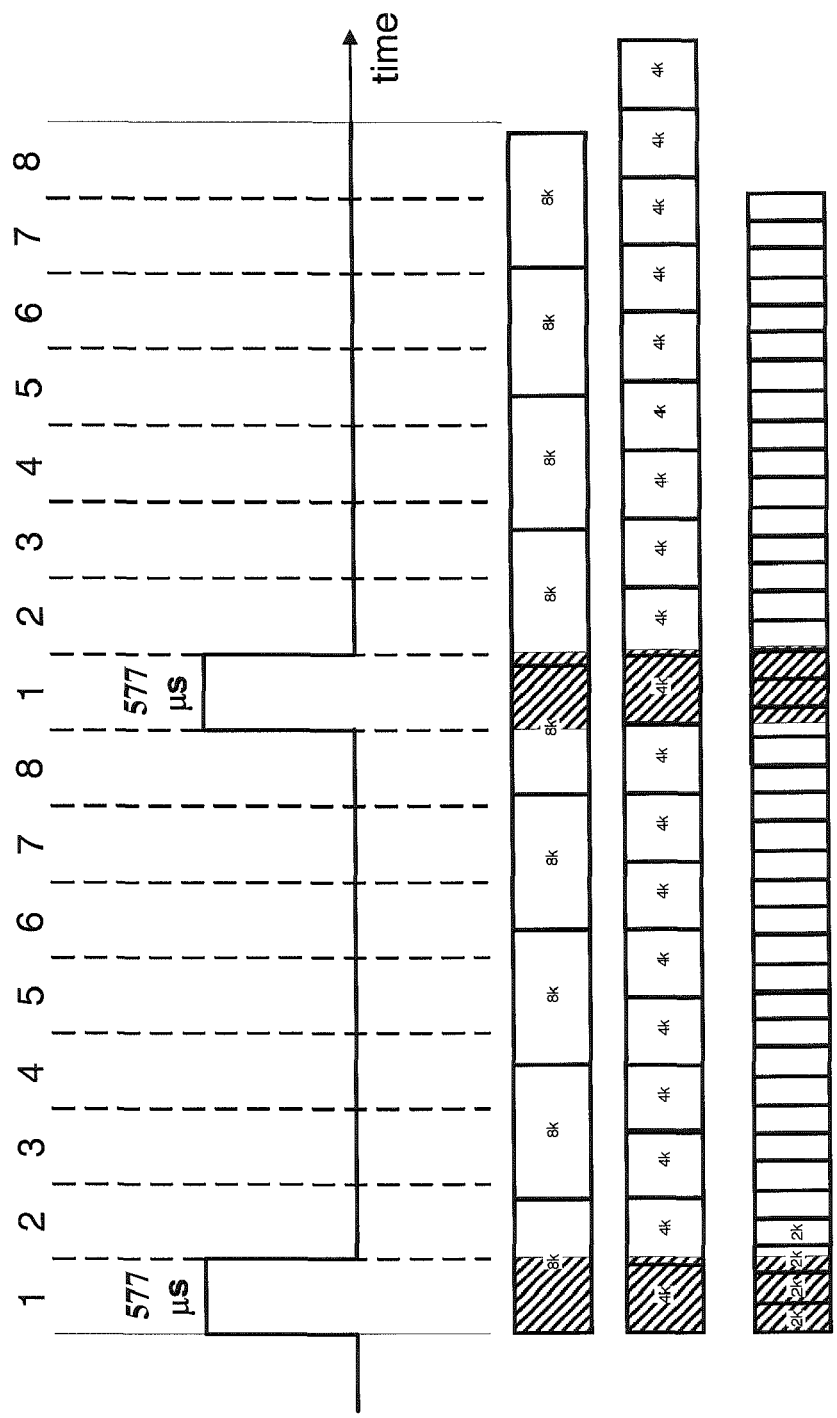
FIG. 4 shows interference at a receiver falling over symbols in different modes of operation

FIG. 4 roughly shows how the interference (broadband noise) falls over the received OFDM symbols in time domain in a digital broadband broadcast receiver in different modes of operation. In the example shown in FIG. 4, the interfering transmitter is again sending in time slot 1. The interfered part of the OFDM symbols in each mode (8K mode, 4K mode and 2K mode shown as examples) is indicated by the striped area.

Figure 5:
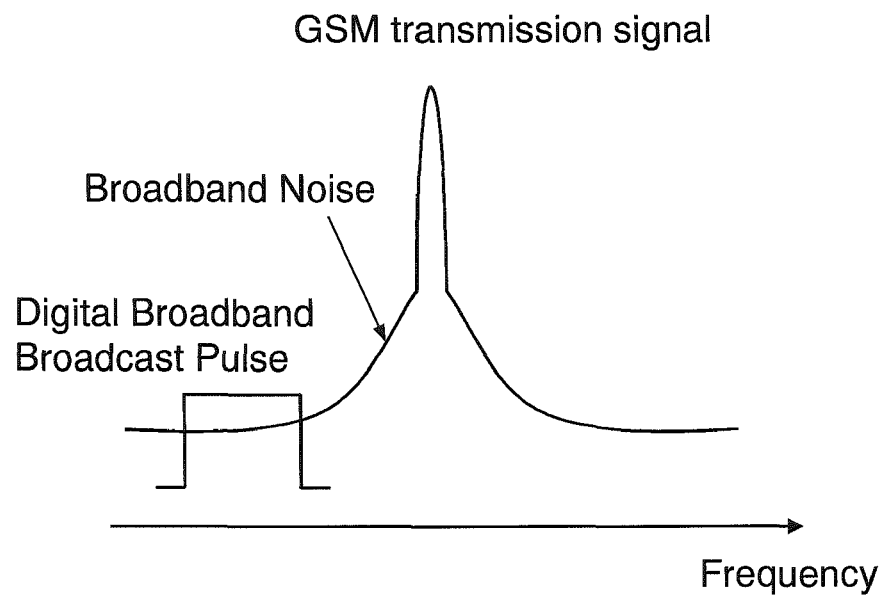
FIG. 5 shows broadband noise produced by a cellular power amplifier.

FIG. 5 shows schematically the interference behavior in frequency domain. A cellular (in the illustrated example: GSM) transmission signal with broadband noise produced by a cellular power amplifier in a terminal device during cellular transmission as well as a digital broadband broadcast signal/pulse is shown in frequency domain. The interfering effect is based on the broadband noise produced by the cellular transmitter.

Figure 6:
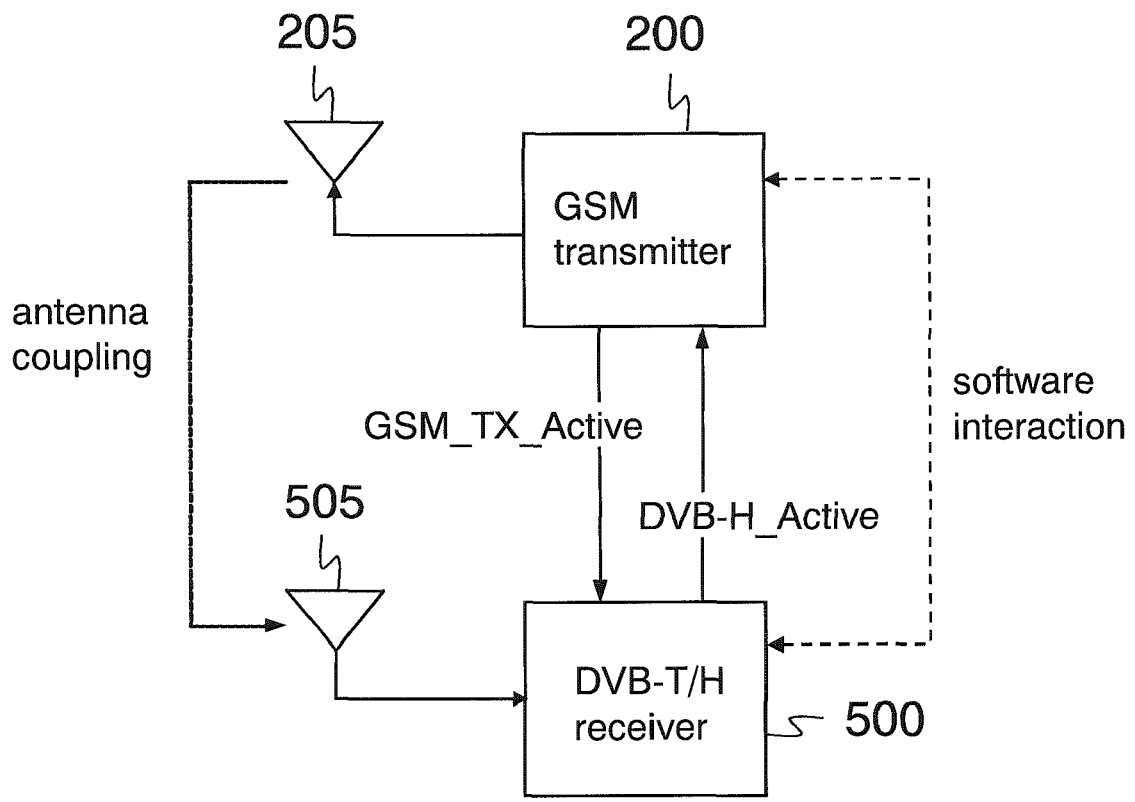
FIG. 6 shows noise coupling and activity signals.

FIG. 6 shows noise coupling in a receiving digital broadband broadcast apparatus in more detail. Although, in this example, the interfering transmitter is located in the same device as the interfered receiver, in other embodiments, the interfering transmitter and interfered receiver may be located in separate co-located devices.

The broadband noise produced by the cellular transmitter 200 is coupled via the cellular antenna 205 to the digital broadband broadcast reception antenna 505 (by antenna coupling), and therefrom to the digital broadband broadcast receiver 500 resulting in interference in digital broadband broadcast reception. It has been suggested to have signaling between the cellular transmitter 200 and digital broadband broadcast receiver 500. These signals may comprise a first signal (here: DVB-H_ACTIVE) transmitted from digital broadband broadcast receiver 500 (here: DVB-H receiver) to cellular transmitter 200 (here: GSM transmitter) signaling to cellular transmitter 200 when digital broadband broadcast reception (here: DVB-H reception) is active, and second signal (here: GSM_TX_ACTIVE) transmitted from cellular transmitter 200 to digital broadband broadcast receiver 500 signaling to digital broadband broadcast receiver 500 when cellular transmitter 200 is active. In an embodiment, transmitting and processing of these activity signals or activity information data may comprise software based interaction between the cellular transmitter 200 and digital broadband broadcast receiver 500. In an embodiment these signals originate from a processor in an apparatus controlling the operation of both the GSM transmitter and DVB-T/H receiver.

Figure 7A:
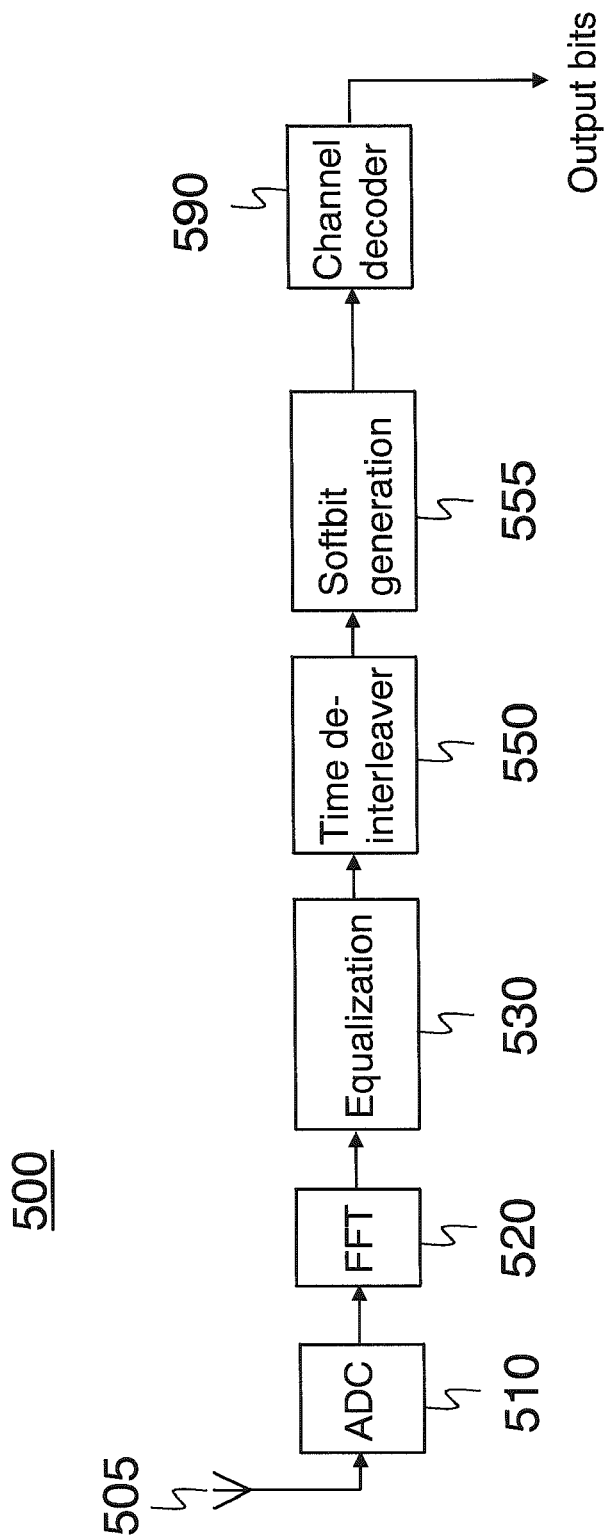
FIG. 7A shows a digital broadband broadcast receiver in accordance with an embodiment.

FIG. 7A shows selected operational blocks of a DVB-T/H receiver 500 (hereinafter referred to as broadband broadcast receiver 500) according to an embodiment.

The broadband broadcast receiver 500 comprises a front end (not shown) which receives the transmitted signal via an antenna 505. An analog-to-digital converter 510 converts the received signal from analog to digital domain. In FFT (Fast Fourier Transform) block 520 a Fast Fourier Transform is performed on the received signal. The received signal is equalized in block 530 based on input received from a channel estimation function (not shown in FIG. 7A). Further, the received signal is deinterleaved in time in block 550. Time deinterleaving is an inverse operation of time interleaving, in which digital data was spread over more than one OFDM symbol. In a softbit generation block 555 softbits are generated for evaluating the reliability of the received digital data. After softbit generation, channel decoding is continued in a channel decoder 590 starting from inner deinterleaving and inner decoding (not shown) followed by outer deinterleaving and outer decoding (not shown). Channel decoded digital data (Output bits) are output from the channel decoder 590 for further processing.

As demonstrated in the co-pending international patent application PCT/FI2007/050128, the timing information of cellular transmission can be utilized in soft-bits generation by scaling the reliability of the received bits according to the amount of interfered part of a received OFDM symbol. This method is referred to as the burst state information (BSI) method.

Figure 7B:
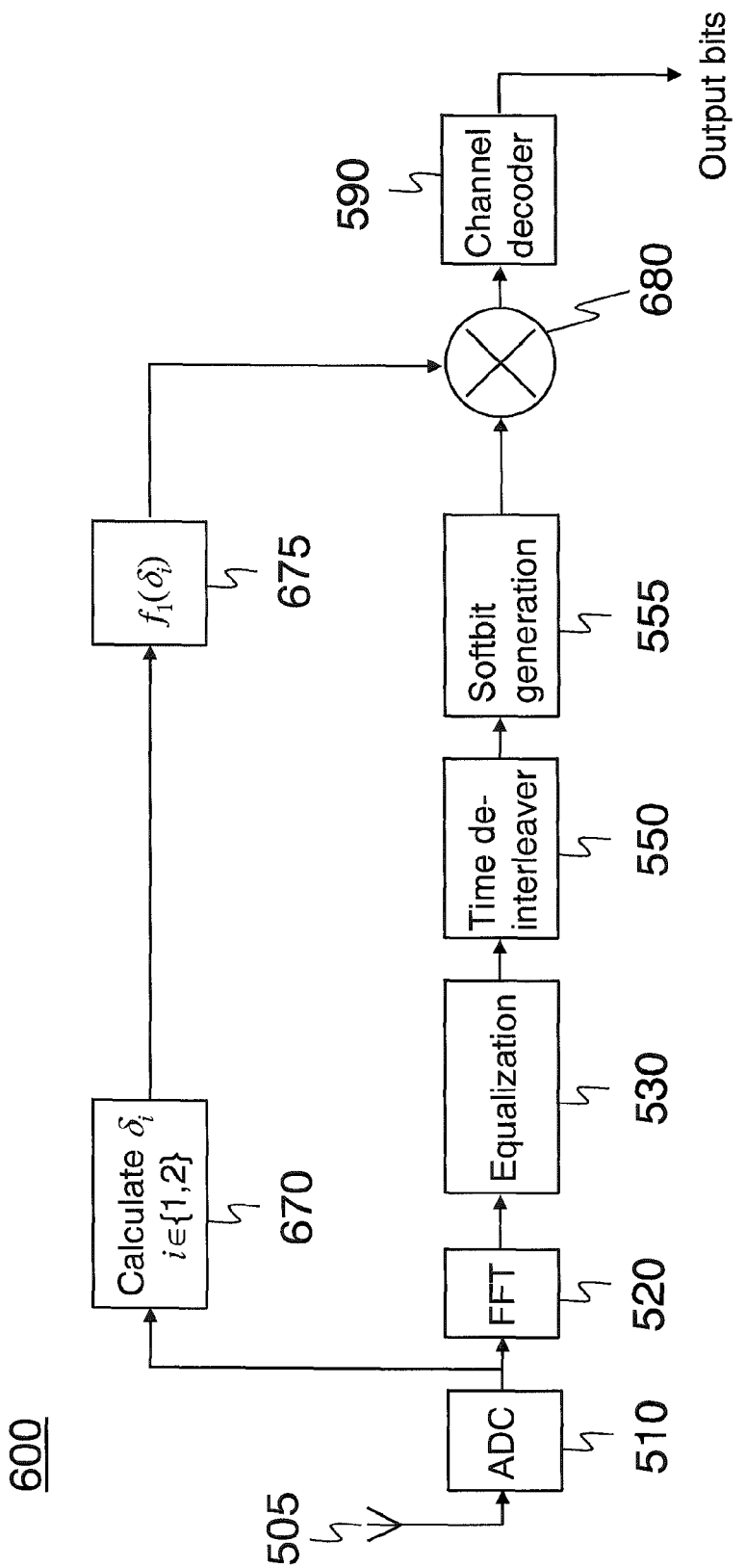
FIG. 7B shows a digital broadband broadcast receiver using a burst state information method in accordance with an embodiment.

FIG. 7B shows an embodiment of the broadband broadcast receiver using the burst state information method. Accordingly, the broadband broadcast receiver 600 of FIG. 7B takes the timing of the GSM burst into account in softbit generation (or reliability information generation).

In the following, the useful OFDM symbol duration, i.e., symbol duration without a guard interval expressed in samples, is denoted by N. The maximum burst duration, expressed in samples, that could affect one OFDM symbol, i.e., the time slot duration (577 μs) is denoted by B. And, the number of samples affected by the burst in the $m^{th}$ OFDM symbol is denoted by x(m). The burst location and duration are known to the broadband broadcast receiver 600 because of the deterministic pattern of the GSM burst. The cellular transmission activity signal (GSM_TX_ACTIVE) obtained, for example, from a dedicated signaling pin in the GSM transmitter or a separate energy detector can by used to detect the timing of interference as shown in PCT/FI2007/050128.

In the embodiment shown in FIG. 7B, the softbits are scaled by the burst state information in the combiner 680. The burst state information is formed in block 675 based on $\delta_i$ (i∈1,2) which has been calculated in block 670 based on the output of the analog-to-digital converter 510. The burst state information (BSI) can be expressed by a function $f_1(\delta_i)$ (i∈1, 2) as follows:

$$BSI = f_1(\delta_1) = \left[\frac{B - x(m)}{B}\right]^{n_1}, \text{ and}$$

$$BSI = f_1(\delta_2) = \left[\frac{N - x(m)}{N}\right]^{n_1}.$$

where $n_1 \geq 0$. The upper equation takes into account the maximum burst duration B that can affect one OFDM symbol, whereas the lower equation takes into account the useful symbol duration N. These equations present alternative expressions of burst state information. Which equation will be used in each particular case depends on the implementation. One burst state information (BSI) is calculated for each symbol. After scaling with burst state information by the combiner 680, error correction is performed in the channel decoder 590.

The value of $n_1$ depends on implementation. When $n_1$ deviates from 1 (i.e., $n_1 \neq 1$), this means that the softbits are scaled non-linearly depending on $n_1$ and on the amount of the interfered part of the OFDM symbol.

The $\delta_i$ (i∈1,2) calculated in block 670 can be expressed as:

$$\delta_1 = \frac{B - x(m)}{B}, \text{ and}$$

$$\delta_2 = \frac{N - x(m)}{N}.$$

It is to be noted that the non-linear functions of burst state information presented in the preceding can be implemented in many different ways. The preceding only presents some examples.

Figure 8:
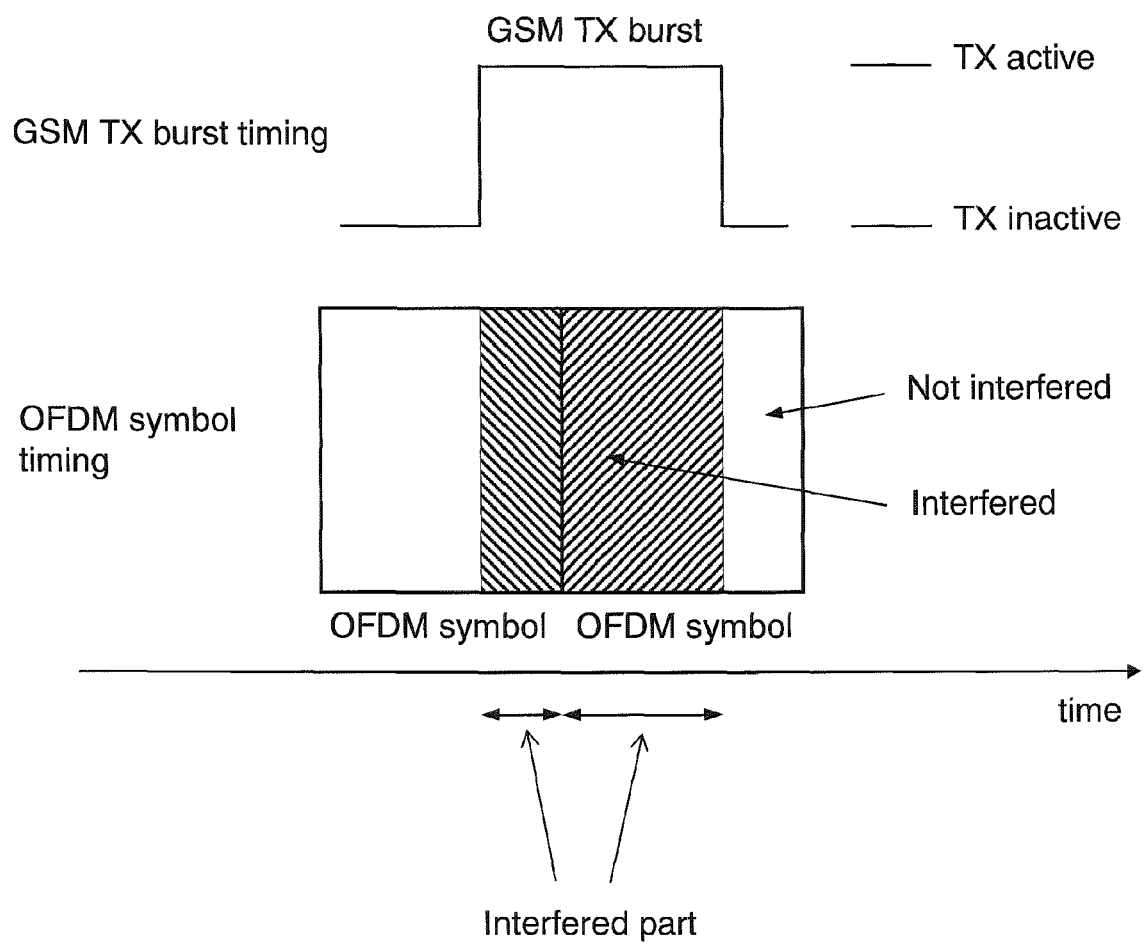
FIG. 8 illustrates reliability information scaling in accordance with an embodiment.

FIG. 8 further illustrates reliability information scaling in accordance with an embodiment. In the Figure, GSM transmission (TX) burst timing in relation to the OFDM symbol timing is shown. In an embodiment, the interfered part of the signal can be blanked (i.e., the corresponding ADC output samples can be set to zero). The burst state information is calculated based on the proportion of the blanked part of the OFDM symbol using a non-linear function and the softbits are scaled accordingly.

Figure 9:
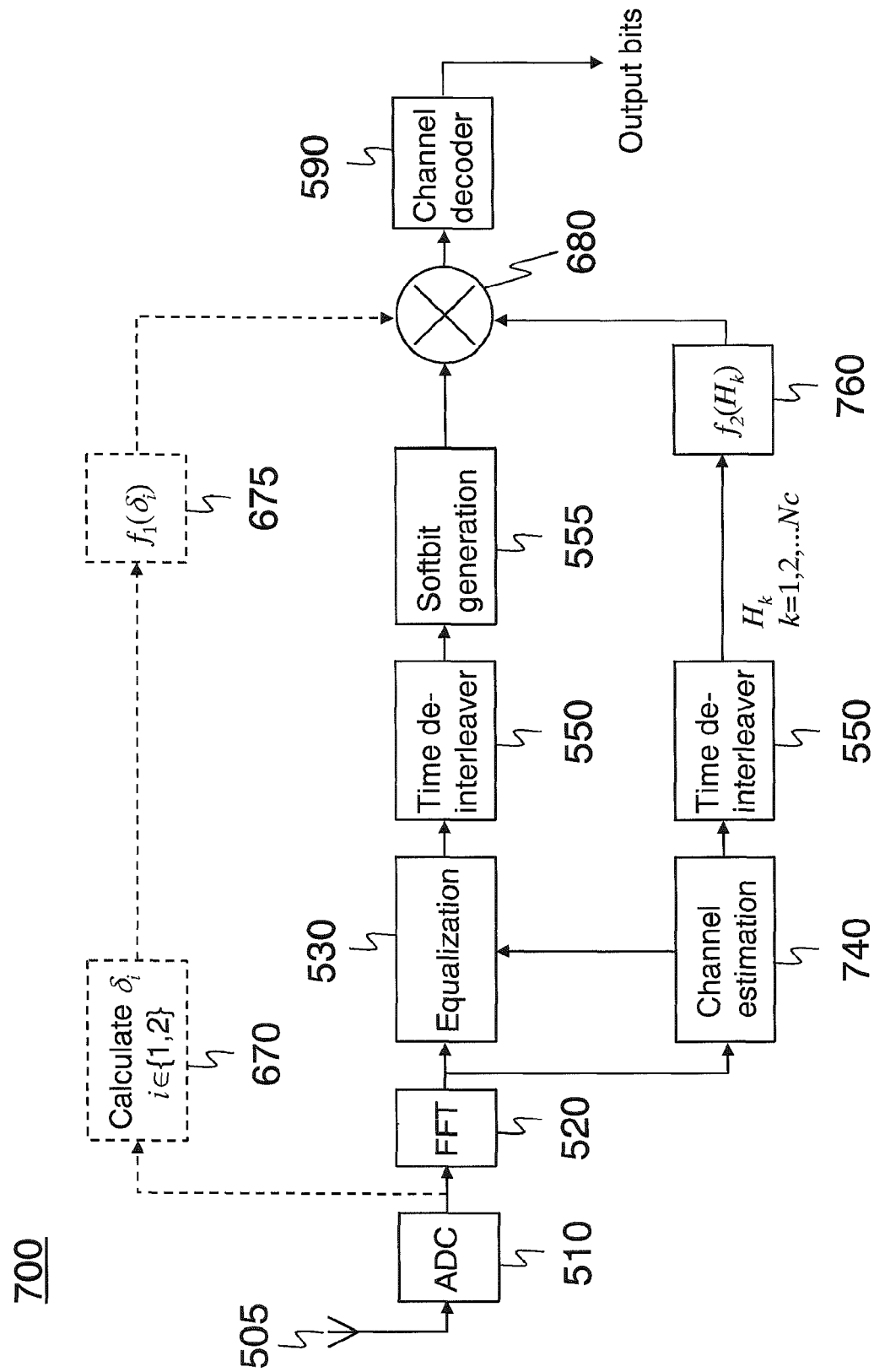
FIG. 9 shows a digital broadband broadcast receiver in accordance with another embodiment.

FIG. 9 shows another embodiment of the broadband broadcast receiver. In this embodiment, the softbits are scaled in the combiner 680 of the broadband broadcast receiver 700 with channel state information (CSI). Accordingly, this method is referred to as the channel state information method. The channel state information method can be used with or without the burst state information method. The channel state information method or the combination of the channel state information and burst state information methods may be used in case of frequency selective channels.

The channel estimation function 740 determines the transmission channel frequency response estimate $H_k$ at carrier k, where k=1, 2, . . . , $N_c$, and controls the equalization function 530. In here $N_c$ denotes the number of carriers. The transmission channel frequency response estimate $H_k$ is conveyed, after time deinterleaving in the lower block 550 to block 760. The channel state information is formed in block 760 based on the transmission channel frequency response estimate $H_k$. The channel state information can be a function of the channel frequency response estimate and can be expressed, for example, by a function $f_2(H_k)$, where k=1, 2, . . . , $N_c$ as follows:

$$CSI = f_2(H_k) = [|H_k|]^{n_2},$$

where $n_2 \geq 0$, and |.| is the absolute operator. The channel state information (CSI) can be formed either as a linear ($n_2$=1) or non-linear function ($n_2 \geq 0$ and $n_2 \neq 1$). In a typical implementation $n_2$=2.

Figure 10:
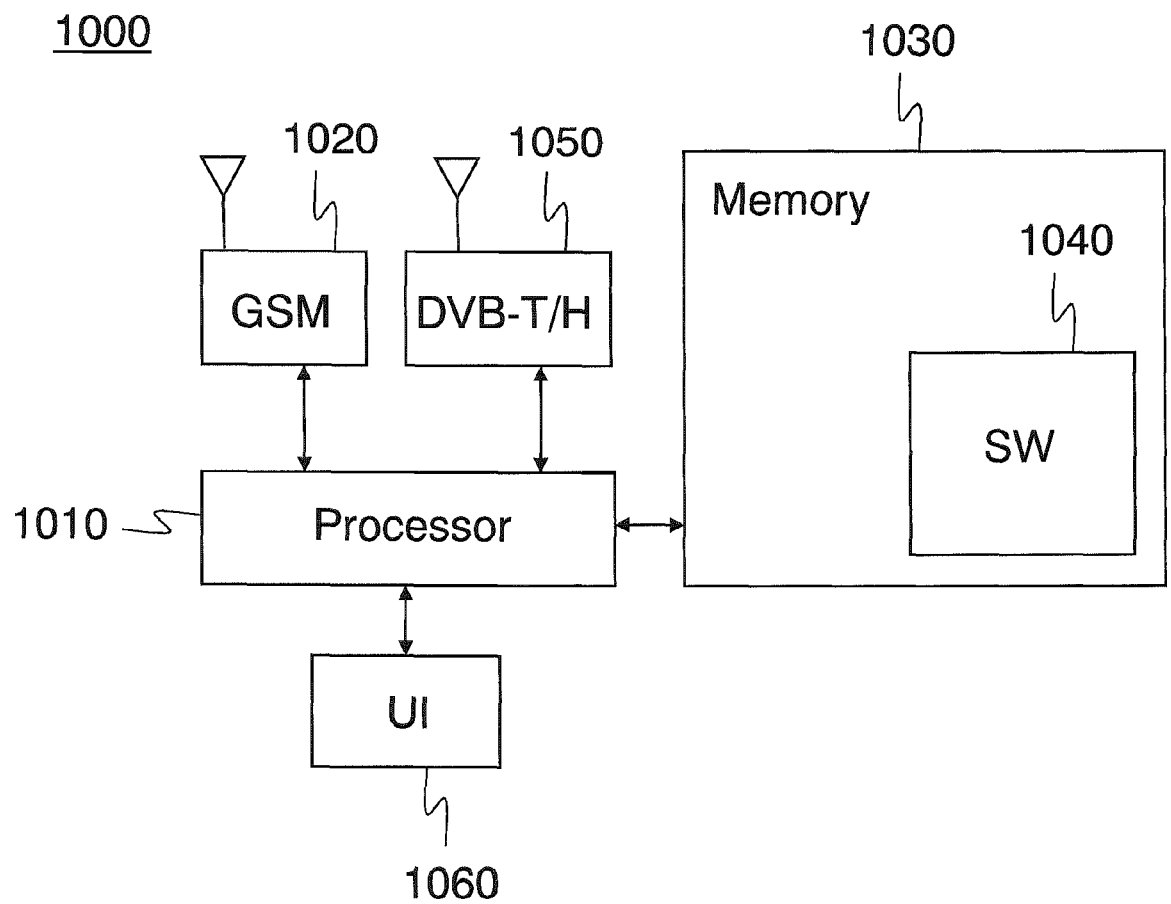
FIG. 10 shows a block diagram of an apparatus in accordance with an embodiment.

FIG. 10 shows a simplified block diagram of an apparatus comprising a digital broadband broadcast receiver and a cellular transmitter in accordance with an embodiment. The apparatus may be a user terminal. The apparatus 1000 comprises a processing unit (or processor) 1010, digital broadband broadcast reception hardware 1050 coupled to the processing unit 1010, cellular transmitter (or transceiver) hardware 1020 coupled to the processing unit 1010, and a memory 1030 coupled to the processing unit 1010. The memory 1030 comprises stored software and/or firmware 1040 which is executable in the processing unit 1010. The hardware 1020 and 1050 may be arranged in a plurality of separate hardware blocks or modules. Software 1040 comprises digital broadband broadcast reception software, which performs software operations relating to the digital data reception, such as controlling time deinterleaving, reliability information scaling, error correction and other control of hardware modules. Software 1040 further comprises cellular communications software, which performs software operation relating to the cellular transmission (and reception). The apparatus 1000 further comprises a user interface 1060 enabling the user to use the apparatus 1000. User interface 1060 is coupled to the processing unit 1010 and typically comprises one or more input and output devices. These may contain, for example: a display and speaker(s) for showing, playing or presenting received digital television, digital video, audio or data transmission, a keyboard, a microphone, a speaker and optionally a separate display for cellular voice call and other cellular operation.

Figure 11:
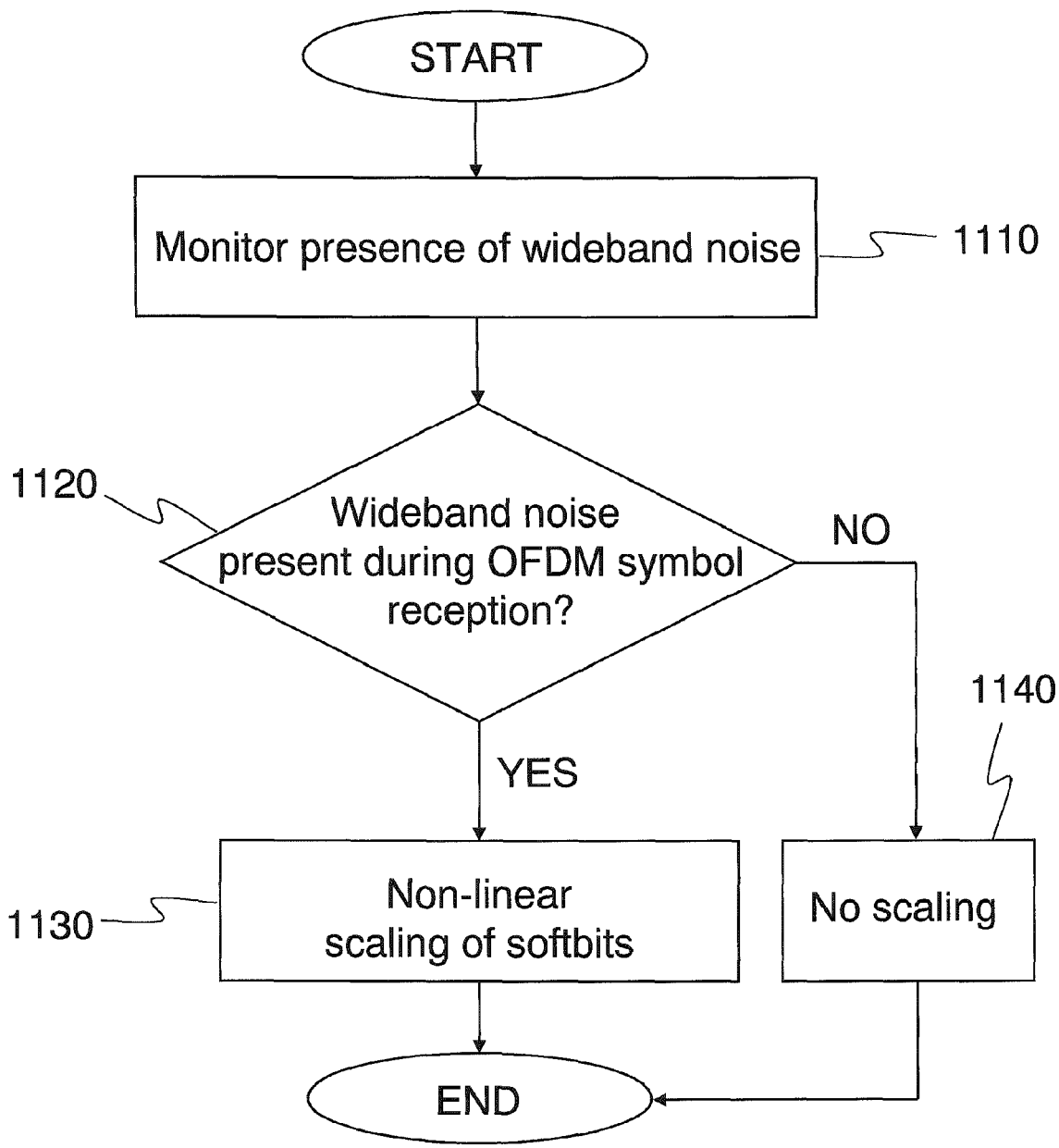
FIG. 11 shows a flow chart of reliability information scaling in accordance with an embodiment.

FIG. 11 shows a flow chart of reliability information scaling in an apparatus comprising a digital broadband broadcast receiver (or an OFDM receiver). The presence of cellular wideband noise is monitored (step 1110). If wideband noise is detected during OFDM symbol reception in step 1120, non-linear scaling of softbits is performed by using the burst state information and/or channel state information method in step 1130. If no wideband noise is detected, no additional scaling of reliability information (step 1140) is performed.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means without deviating from the characteristics of the invention.

Furthermore, some of the features of the above-disclosed embodiments of this invention may be used to advantage without the corresponding use of other features. As such, the foregoing description should be considered as merely illustrative of the principles of the present invention, and not in limitation thereof. Hence, the scope of the invention is only restricted by the appended patent claims.

The invention claimed is:

1. An apparatus, comprising:
   a digital broadband receiver configured to receive bits transmitted in orthogonal frequency division multiplexing transmission symbols; and
   a scaling module configured to scale a reliability of the received bits with a scaling function which is in relation to an amount of interference to a time domain portion of a received orthogonal frequency division multiplexing transmission symbol;
   wherein the apparatus is configured to calculate the scaling function based on interfering transmission burst state information.

2. The apparatus of claim 1, wherein the burst state information indicates a number of samples not affected by a burst in relation to useful orthogonal frequency division multiplexing transmission symbol duration expressed in samples.

3. The apparatus of claim 1, wherein the burst state information indicates a number of samples not affected by a burst in relation to a maximum burst duration expressed in samples, that could affect one orthogonal frequency division multiplexing transmission symbol.

4. The apparatus of claim 1, wherein the scaling function is a non-linear scaling function that is selected from the following functions representing interfering transmission burst state information (BSI):

$$BSI=[(B-x(m))/B]^{n_1}, \text{ where } n_1 \geq 0 \text{ and } n_1 \neq 1; \text{ and}$$

$$BSI=[(N-x(m))/N]^{n_1}, \text{ where } n_1 \geq 0 \text{ and } n_1 \neq 1,$$

where a maximum burst duration that could affect one orthogonal frequency division multiplexing transmission symbol is denoted by B expressed in number of samples, a useful orthogonal frequency division multiplexing transmission symbol duration is denoted by N expressed in a number of samples, and the number of samples affected by the burst in the mth orthogonal frequency division multiplexing transmission symbol is denoted by x(m).

5. The apparatus of claim 1, wherein the apparatus is further configured to scale the reliability of the received bits with a second function which is based on transmission channel state information.

6. The apparatus of claim 5, wherein the transmission channel state information is a function of channel frequency response estimate.

7. The apparatus of claim 5, wherein the channel state information (CSI) is determined by the function:

$$CSI=[|H_k|]^{n_2}, \text{ where } n_2 \geq 0,$$

where $H_k$ denotes a transmission channel frequency response estimate at carrier k, where $k=1,2,\ldots,N_c$, and $N_c$ denotes the number of carriers.

8. The apparatus of claim 1, wherein the apparatus is configured to time the scaling based on detected cellular wideband noise transmitted by a cellular transmitter in the same or a co-located apparatus or based on information signaled about the presence of cellular wideband noise.

9. The apparatus of claim 1, wherein the apparatus is further configured to determine the amount of interfered part of the received orthogonal frequency division multiplexing transmission symbol based at least in part on a number of samples of the received orthogonal frequency division multiplexing transmission symbol affected by a burst.

10. A method, comprising:
    receiving in a digital broadband receiver bits transmitted in orthogonal frequency division multiplexing transmission symbols; and
    scaling a reliability of the received bits with a scaling function;
    wherein the scaling function is a function which is in relation to an amount of interference to a time domain portion of a received orthogonal frequency division multiplexing transmission symbol; and
    wherein the method comprises calculating the scaling function based on interfering transmission burst state information.

11. The method of claim 10, wherein the burst state information indicates a number of samples not affected by a burst in relation to useful orthogonal frequency division multiplexing transmission symbol duration expressed in samples.

12. The method of claim 10, wherein the burst state information indicates a number of samples not affected by a burst in relation to a maximum burst duration, expressed in samples, that could affect one orthogonal frequency division multiplexing transmission symbol.

13. The method of claim 10, wherein the method further comprises to scale the reliability of the received bits with a second function which is based on transmission channel state information.

14. A computer program product comprising a Non-transitory computer readable medium bearing computer program code embodied therein for use with an apparatus, the computer program code configured to cause:
    receiving bits in a digital broadband receiver transmitted in orthogonal frequency division multiplexing transmission symbols;
    scaling a reliability of the received bits with a scaling function; and
    calculating the scaling function based on interfering transmission burst state information;
    wherein the scaling function is a function and is in relation to an amount of interference to a time domain portion of a received orthogonal frequency division multiplexing transmission symbol.

15. The computer program product of claim 14, wherein the burst state information indicates a number of samples not affected by a burst in relation to useful orthogonal frequency division multiplexing transmission symbol duration expressed in samples.

16. A scaling module for a digital broadband receiver configured to scale a reliability of received bits transmitted in orthogonal frequency division multiplexing transmission symbols;
    wherein the scaling module comprises a physical hardware module;
    wherein the scaling module is configured to scale the reliability of the received bits by a scaling function which is in relation to an amount of interference to a time domain portion of a received orthogonal frequency division multiplexing transmission symbol; and
    wherein the scaling module is configured to calculate the scaling function based on interfering transmission burst state information.

17. The scaling module of claim 16, wherein the burst state information indicates a number of samples not affected by a burst in relation to useful orthogonal frequency division multiplexing transmission symbol duration expressed in samples.

18. An apparatus, comprising:
- means for receiving bits transmitted in orthogonal frequency division multiplexing transmission symbols;
- means for scaling the reliability of the received bits with a scaling function which is in relation to an amount of interference to a time domain portion of a received orthogonal frequency division multiplexing transmission symbol; and
- means for calculating the scaling function based on interfering transmission burst state information.

* * * * *